United States Patent
Singh et al.

(10) Patent No.: US 7,525,099 B2
(45) Date of Patent: Apr. 28, 2009

(54) NUCLEAR RADIATION DETECTION SYSTEM

(75) Inventors: Narsingh Bahadur Singh, Ellicott City, MD (US); Aaron A. Pesetski, Gamrills, MD (US); Andre Berghmans, Owing Mills, MD (US); Brian P. Wagner, Baltimore, MD (US); David Kahler, Arbutus, MD (US); David J. Knuteson, Columbia, MD (US); Darren Thomson, Ellicott City, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 0 days.

(21) Appl. No.: 11/699,335

(22) Filed: Jan. 30, 2007

(65) Prior Publication Data

US 2008/0179534 A1     Jul. 31, 2008

(51) Int. Cl.
*G01J 1/42* (2006.01)
(52) U.S. Cl. .................................. 250/372
(58) Field of Classification Search ............ 250/372
See application file for complete search history.

(56) References Cited

U.S. PATENT DOCUMENTS 5,742,428 A * 4/1998 Singh et al. ............ 359/350
5,788,765 A * 8/1998 Singh et al. ............ 117/68
5,837,054 A * 11/1998 Singh et al. ............ 117/10
6,369,392 B1 * 4/2002 Ruderman et al. ...... 250/372
6,452,189 B1 * 9/2002 Livneh et al. .......... 250/372

* cited by examiner

*Primary Examiner*—David P Porta
*Assistant Examiner*—Mark R Gaworecki
(74) *Attorney, Agent, or Firm*—Andrews Kurth LLP

(57) ABSTRACT

A nuclear radiation detection system using narrowband UV crystal filters is disclosed. Since the photons produced during the decay of β- and γ-radiation can be detected in the spectral range of about 200-350 nm (the ultraviolet range), UV filter based photo sensors are utilized for detection. The nuclear radiation detection system comprises an optical assembly capable of focusing on a source of radiation, a UV filter assembly having a narrowband UV crystal filter and positioned to receive light transmitted through the optical assembly, and a light detector positioned to receive light transmitted through the UV filter assembly. The narrowband UV crystal filter is fabricated from crystals selected from the group consisting of nickel fluorosilicate, nickel fluoroborate, and potassium nickel sulfate. The nickel fluorosilicate, nickel fluoroborate, and potassium nickel sulfate may be doped to achieve even narrower band filter. The radiation detection system can be used to monitor contamination in a nuclear plant or a nuclear waste dump site. It may also be used for surveillance of contamination in case of a nuclear accident.

19 Claims, 3 Drawing Sheets

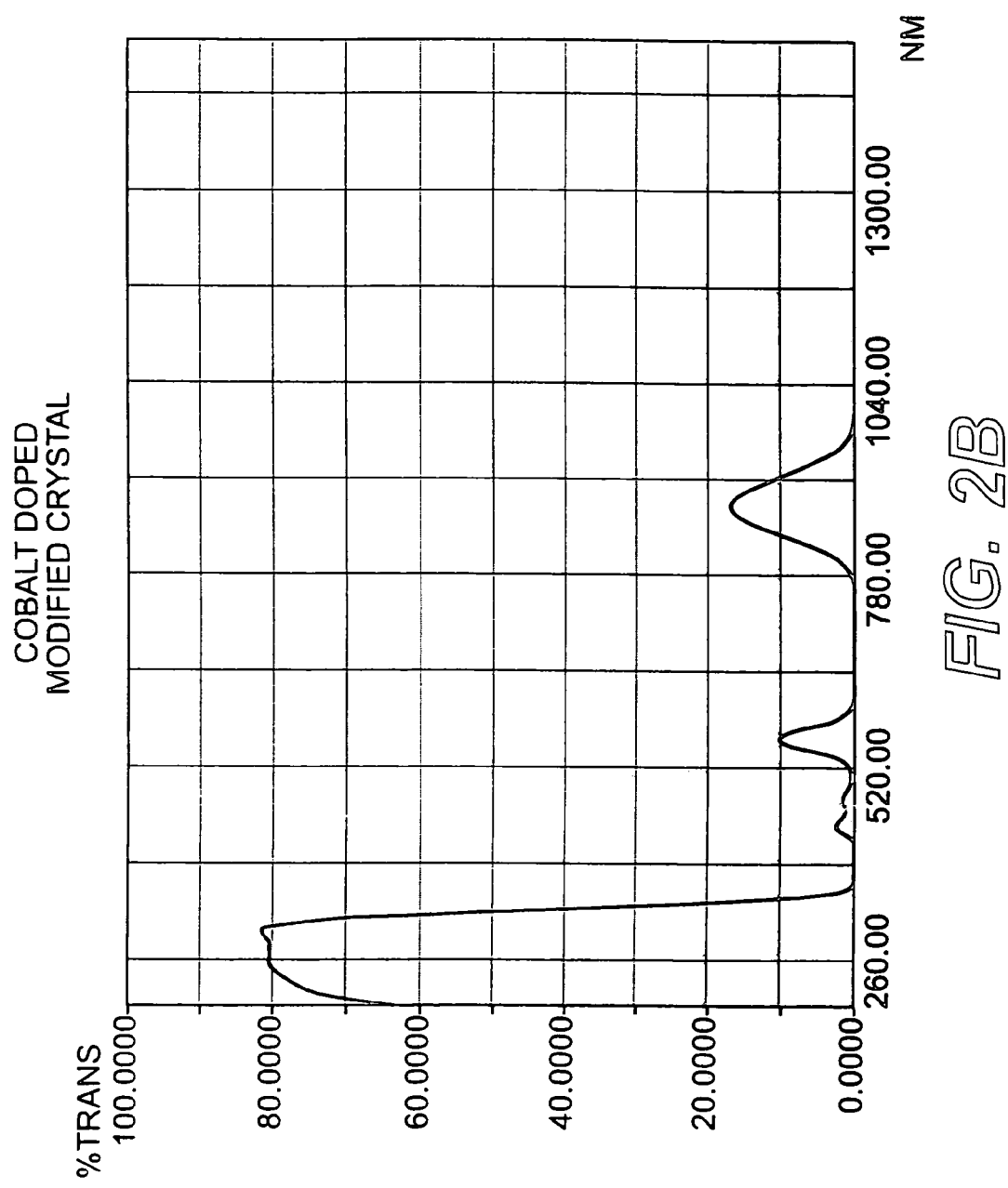

NUCLEAR RADIATION DETECTION SYSTEM

TECHNICAL FIELD

This invention generally relates to detection systems for photons produced during the decay of β- and γ-radiations in the spectral range of 200-350 nm and, in particular, to radiation detection system having a narrowband ultraviolet crystal filter.

BACKGROUND OF THE INVENTION

There is a continuous effort to develop imagers and detectors for nuclear, biological and chemical (NBC) warfare defenses. The objective is to develop an integrated system of nuclear, chemical and biological sensors in real time during day or night from a remote vantage point. Such a system would provide the capability to detect and survive an initial NBC attack.

A typical ultraviolet (UV) optical system includes optical components for focusing photons produced during the decay of β- and γ-radiations onto a UV filter sensor, a filter for reducing the amount of radiation not in the UV window (e.g., 200-350 nm), and electronics which process and act on signals from the UV sensitive sensor. To date, most UV optical filters include a series of optical filter elements that are stacked to achieve a desired spectral response. Each optical filter element in the series is a single separate optical filter.

There are a variety of devices which use ultraviolet (UV) light filters that allow selected wavelengths of light to pass through. For example, such filters are used in passive missile approach warning systems (PMAWS) which locate and track sources of ultra-violet energy, enabling the system to distinguish the plume of an incoming missile from other UV sources that pose no threat.

All UV sensors have finite sensitivity to visible radiations. It is very important for a UV sensor to discriminate against the visible radiation so as to maximize UV sensitivity while minimizing false signals caused by visible light sources. Therefore, the UV filters should have high transmittance in the UV spectral region and have strong absorption at longer wavelengths. Moreover, the filters should have high thermal stability because the nuclear sensors may be used in environments with high temperatures, such as aircrafts parked in tropical and desert areas.

It is known that certain transition metal ions, such as $Ni^{2+}$ and $Co^{2+}$, absorb visible radiations and transit in certain UV range. These metals have been used in UV filters such as Corning 9863 glass which is a UV transmitting glass doped with $Ni^{2+}$ and $Co^{2+}$. The doped glass provide effective blocking of visible radiations. However, there is a significant absorption in 250-300 nm wavelength region that sacrifices in-band transmittance and reduces the sensitivity of the detector.

Radiation emitted from a nuclear fission is typically detected by directly detecting the presence of high energy β- and γ-particles. The detection method, however, requires a sensor being placed in the close vicinity of the radiation source because β-particles lost their energy over a range from centimeters to meters and γ-particles lost their energy over a range in the order of hundreds of meters in air.

Therefore, there still exists a need for nuclear detectors capable of detecting nuclear radiation over an extended distance.

SUMMARY OF THE INVENTION

The present invention is directed to a nuclear radiation detection system. The photons produced during the decay of β- and γ-radiation can be detected in the spectral range of 200-350 nm (the ultraviolet range). This is a "solar-blind" range because radiation from the sun in this wavelength range is completely absorbed by the ozone layer in the upper atmosphere. The nuclear radiation detection system comprises: an optical assembly capable of focusing on a source of radiation; a UV filter assembly having a narrowband UV crystal filter and positioned to receive light transmitted through the optical assembly; and a light detector positioned to receive light transmitted through the UV filter assembly.

The narrowband UV crystal filter is fabricated from crystals selected from the group consisting of nickel fluorosilicate, nickel fluoroborate, and potassium nickel sulfate. The nickel fluorosilicate, nickel fluoroborate, and potassium nickel sulfate may be doped with at least one dopant.

The dopant is selected from the group consisting of salts of cobalt, calcium, barium, strontium, lead, copper, germanium, praseodymium, neodymium, zinc, lithium, potassium, sodium, rubidium, and cesium.

In one embodiment, the UV filter assembly has a transmission window for UV light having a wavelength of between about 200 nm and about 350 nm.

In another embodiment, the UV filter assembly has a transmission window for UV light having a wavelength of between about 200 nm and about 300 nm.

In another embodiment, the narrowband UV crystal filter is fabricated from crystals selected from the group consisting of cobalt nickel fluorosilicate, cobalt nickel fluoroborate, and cobalt potassium nickel sulfate.

In another embodiment, the narrowband UV crystal filter is fabricated from crystals selected from the group consisting of cobalt nickel fluorosilicate doped with lead, calcium or a mixture thereof; cobalt nickel fluoroborate doped with lead, calcium or a mixture thereof; and cobalt potassium nickel sulfate doped with lead, calcium or a mixture thereof.

In another embodiment, the optical assembly comprises an optical lens.

The nuclear radiation detection system of the present invention may further comprise an alarm or display device. The system may have a detection range of one kilometer or longer.

These and other embodiments of the invention are further described below with references to the following figures.

BRIEF DESCRIPTION OF THE FIGURES

FIGS. 2A and 2B are absorption curves showing spectral characteristics of pure nickel fluorosilicate (FIG. 2A) and nickel/cobalt fluorosilicate (FIG. 2B). The Y-axis represents percent of transmission (% TRANS). The X-axis shows wave length in nanometer (nm).

DETAILED DESCRIPTION OF THE INVENTION

The radioactive decay products of nuclear fission are largely emitters of β-particles, which are electrons in an energy range between several kilovolts and several megavolts. The energy of the β-particles is dissipated by an avalanche of secondary processes as the electrons are inelastically scattered by the molecules in the air over a range from centimeters to meters. About 1% of the initial energy is converted into scintillation photons in pure nitrogen. The energy in the nitrogen is further reduced by atmospheric oxygen to about 0.02% of the initial energy via a process of radiationless energy transfer called quenching. This type of quenching process, which to a lesser degree also include inelastic collision of an excited $N_2$ molecule with a ground-state $N_2$ molecule, limit the scintillation time produced by an individual β-particle to about 1 nano-second in the normal atmosphere.

Next to β-particles, the radioactive decay products of nuclear fission also produce γ-radiation. The γ-radiation, however, occurs at lower intensities since it applies only to a minority of the fission produced isotopes. The γ-radiation decays exponentially over a 1/e range in the order of hundreds of meters in the air. Extended over a longer range, a γ-particle produces secondary processes similar to those produced by a β-particle.

The photons produced during the decay of β- and γ-radiation can be detected in the spectral range of 200-350 mm (the ultraviolet range). This is a "solar-blind" range because radiation from the sun in this wavelength range is completely absorbed by the ozone layer in the upper atmosphere. Therefore, the only environmental competition to the fission product scintillation in the spectral region is the emission caused by natural radioactivity and cosmic rays, which constitute the background noise.

Figure 1:
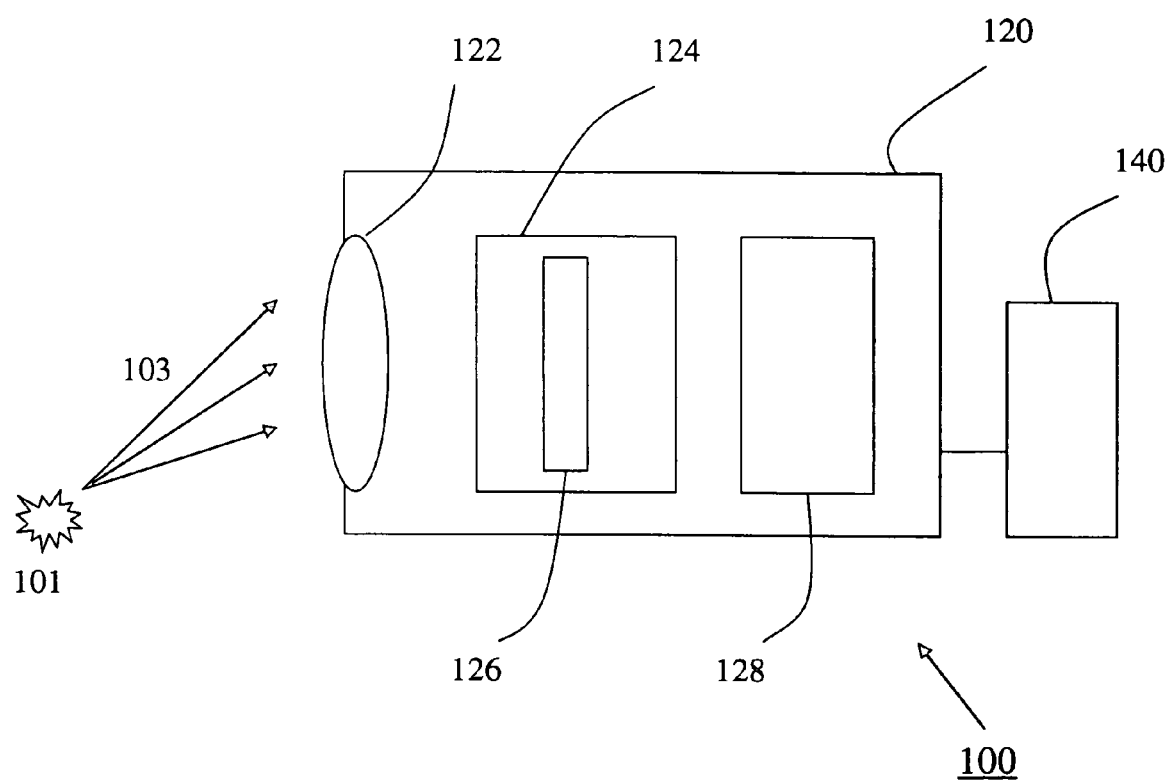
FIG. 1 is a diagram of a nuclear radiation detection system having a crystal narrowband UV filter according to the present invention.

FIG. 1 is a diagram of a nuclear radiation detection system 100 according to the present invention. The radiation detection system 100 comprise a UV sensor 120 and an alarm or display device 140. The UV sensor 120 contains a light-gathering optical assembly 122, an UV filter assembly 124, and a light detector 128. The light-gathering optical component 122 is capable of focusing on a radiation source 101 and directing UV light 103 from the radiation source 101 onto the UV filter assembly 124. The light-gathering optical assembly 122 can include any collection of optical elements (e.g., lenses or mirrors).

The UV filter assembly 124 comprises a narrowband crystal UV filter 126 made of nickel fluorosilicate ($NiSiF_6 \cdot 6H_2O$), nickel fluoroborate ($Ni(BF_4)_2 \cdot 6H_2O$) or potassium nickel sulfate ($K_2Ni(SO_4)_2 \cdot 6H_2O$) crystals. The narrowband crystal UV filter 126 may be doped with one, two, or more dopant ions to obtain the required transmission window. A typical narrowband crystal UV filter 126 is shown in FIG. 3. In one embodiment, the narrowband crystal UV filter 126 has a transmission window between about 200 and about 350 mm. In another embodiment, the narrowband crystal UV filter 126 has a transmission window between about 250 and about 350 mm. In another embodiment, the narrowband crystal UV filter 126 has a transmission window between about 250 and about 300 mm. The transmission window can be even further narrowed by adding Hoya glass in the filter geometry of the UV filter assembly 124. Other embodiments of the invention can have transmission windows in wavelength outside the 200-350 mm range.

Light collected by the light-gathering optical component 122 strikes the UV filter assembly 124 and only the desired wavelengths are passed onto the light detector 128. The light detector 128 can be any detection device for detecting radiation in the desired wavelength range, e.g. about 200-350 nm. Detection devices for light detector 128 are well known in the art and include, for example, photo-multiplier tubes, charge coupled devices (CCDs), and solid state detector devices such as gallium nitride detectors. The light detector 128 can be a point detector, a two-dimensional array, or a videocon-type tube. The light detector 128 also includes detection electronics associated with the detection device (e.g., electronics for signal processing, data displays and data acquisition). In combination with the light-gathering optical assembly 122, the light detector 128 may be used in a field-scanning mode.

The alarm or display device 140 can be any device which, upon detection of a threshold level (which can be set as low as desired), alerts a user of the presence of UV radiation or displays an image of the radiation source 101.

The radiation detection system of the present invention can be used for long range detection such as air surveillance. In one embodiment, the radiation detection system of the present invention has a detection range of one kilometer or longer. The radiation detection system can be used to monitor contamination in a nuclear plant or a nuclear waste dump site. It may also be used for surveillance of contamination in case of a nuclear accident.

The doped nickel fluorosilicate ($NiSiF_6 \cdot 6H_2O$), nickel fluoroborate ($Ni(BF_4)_2 \cdot 6H_2O$) or potassium nickel sulfate ($K_2Ni(SO_4)_2 \cdot 6H_2O$) (collectively "the nickel compounds") crystals can be produced by preparing a saturated nutrient solution of a nickel compound and a dopant salt and growing doped crystals from the nutrient solution using methods described in U.S. patent application Ser. No. 11/580,834, which is hereby incorporated by reference in its entirety.

The dopant salt is preferably a salt that matches the nickel compound, e.g., a fluorosilicate salt for $NiSiF_6 \cdot 6H_2O$, a fluoroborate salt for $Ni(BF_4)_2 \cdot 6H_2O$, and a potassium sulfate salt for $K_2Ni(SO_4)_2 \cdot 6H_2O$. Examples of the dopant ions include, but are not limited to are transition metal ions. The ratio between the nickel compound and the dopant salt is determined based on the desired absorption characteristics of the doped crystals grown out of the solution.

The nutrient solution is prepared at an elevated temperature, preferably in the range of 35° C. to 45° C., and then cooled at a controlled cooling rate. A seed crystal is added to initiate the crystallization process. Crystals are harvested when they reach desired sizes. In one embodiment, the cooling rate is 0.1° C.-5° C./100 hour. In another embodiment, an acid is added to the nutrient solution to keep the pH of the solution in the range of 1-3. The quality of the crystals is controlled by the temperature, the cooling rate, the size of the bath containing the nutrient solution, the quality of seed, and the purity of the starting materials.

Grown crystals of un-doped or doped nickel fluorosilicate ($NiSiF_6 \cdot 6H_2O$), nickel fluoroborate ($Ni(BF_4)_2 \cdot 6H_2O$) or potassium nickel sulfate ($K_2Ni(SO_4)_2 \cdot 6H_2O$) are fabricated into filters using conventional methods. Typically, the crystals are cut into desired sizes, mounted on a support, and shaped into filters of desired shapes. The filters are polished using nonaqueous lubricants such as Linde powder and ethylene glycol. In one embodiment, the narrow band UV filters of produced by the method 100 have a transmission window between 200 nm and 350 nm.

The nickel compounds may be doped with two or more metal ions to form multi-doped crystals of the nickel compounds. The multi-doped crystals of the nickel compounds can be obtained by producing single-doped nickel compound crystals with fluorosilicate, nickel fluoroborate or potassium nickel sulfate crystals and a first dopant salt by a first solution growth procedure, producing multi-doped nickel compound crystals with the single-doped nickel compound crystals and a second dopant salt or a mixture of dopant salts by a second solution growth procedure, and fabricating narrowband UV filter using multi-doped crystals obtained from the second solution growth procedure.

The second solution growth procedure is carried out under conditions similar to that of the first solution growth procedure. Briefly, a saturated solution of single-doped nickel compounds (i.e., nickel fluorosilicate, nickel fluoroborate or potassium nickel sulfate crystals doped with a first dopant) is mixed with a saturated solution of the second dopant or a mixture of dopants (the doping solution) at an elevated temperature (e.g., 35° C. to 45° C.) to form a crystallization mixture. A small pre-grown seed crystal was added to the crystallization mixture for the nucleating. The temperature of the crystallization mixture was then lowered gradually (e.g., at a rate of 0.1° C.-5° C./100 hour) to allow crystallization of double-doped nickel compounds. The dopant ions can be provided in the form of a salt, such as a carbonate salt, sulfate salt, nitrate salt, chloride salt, chlorate salt, or phosphoric salt. The transmission spectra of the crystallization mixture is determined. The amount of the doping solution in the crystallization mixture can be adjusted until a desired transmission spectra is achieved.

Typically, the amount of the doping solution is in the range of approximately 0.1-5% (v/v), more preferably in the range of approximately 0.5-3% (v/v) of the saturated solution of the single-doped nickel compounds. As used hereinafter, a "low concentration" of the second dopant generally refers to an amount of doping solution in the range of approximately 0-3% (v/v), and a "high concentration" of the second dopant generally refers to an amount of doping solution in the range of approximately 3-5% (v/v).

The doping solution may be a saturated solution of two or more dopants. The total amount of dopants and the ratio among the different dopants may be adjusted to achieve the desired transmission spectra.

In one embodiment, a saturated solution of $Ni_xCo_{(1-x)}SiF_6.6H_2O$ or $K_2Ni_xCo_{(1-x)}(SO_4)_2.6H_2O$ is prepared and mixed with a doping solution of $PbCO_3$, $CaCO_3$ or a mixture of $PbCO_3$ and $CaCO_3$ to form a crystallization mixture.

The grown, multi-doped nickel compound crystals are fabricated into filters using conventional methods. The crystals are then cut into desired sizes, mounted on a support, and shaped into filters of desired shapes. The filters may be polished using non-aqueous lubricants such as Linde powder and ethylene glycol.

EXAMPLES

Example 1

Preparation of $Ni_xCo_{(1-x)}SiF_6.6H_2O$, Crystals $Ni_xCo_{(1-x)}SiF_6.6H_2O$ crystals are grown in a saturated solution of $NiSiF_6$ and $CoSiF_6$. The ratio between the $NiSiF_6$ and $CoSiF_6$ affects the absorption characteristics of the $Ni_xCo_{(1-x)}SiF_6.6H_2O$ crystals grown out of the solution. In one embodiment, the $NiSiF_6$:$CoSiF_6$ ratio in the solution is between 2:1 and 6:1, preferably between 3:1 and 5:1, and more preferably between 3:1 and 4:1.

$NiSiF_6$ and $CoSiF_6$ are synthesized by reactions between their corresponding carbonate salts and hydrofluorosilicic acid. The reactions can be given as follows:

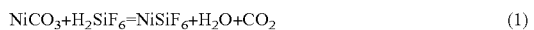  (1)

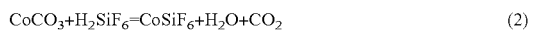  (2)

The reaction mixtures are heated to 80° C. to accelerate the reactions. The reactions are preferably carried out in plastic containers because hydrofluorosilicic acid is erosive to glass containers. After their synthesis, $NiSiF_6.6H_2O$ and $CoSiF_6.6H_2O$ are purified by recrystallizing from water. FIG. 3 is a picture of recrystallized $NiSiF_6.6H_2O$ crystals.

The crystallization of $Ni_xCo_{(1-x)}SiF_6.6H_2O$ is carried out under conditions suitable for growing $NiSiF_6.6H_2O$ crystals. The conditions are described in detail in the U.S. Pat. No. 5,837,054, which is hereby incorporated by reference. In one embodiment, a saturated $NiSiF_6$/$CoSiF_6$ solution is prepared at an elevated temperature of 35° C. to 45° C., preferably at about 40° C. The temperature of the solution is then lowered gradually (e.g., at a rate of 0.2° C.-5° C./100 hour) to allow the formation of $Ni_xCo_{(1-x)}SiF_6.6H_2O$ crystals.

$H_2SiF_6$ may be added to the $NiSiF_6$/$CoSiF_6$.solution to keep the pH of the solution in the range of 1-3, preferably at pH 2. The low pH environment improves the quality of crystals by stopping nucleation.

Example 2

Preparation of $K_2Ni_xCo_{(1-x)}(SO_4)_2.6H_2O$ Crystals $K_2Ni_xCo_{(1-x)}(SO_4)_2.6H_2O$ crystals were grown in a saturated solution of $K_2Ni(SO_4)_2$ and $K_2CO(SO_4)_2$. Commercially available $K_2Ni(SO_4)_2$ and $K_2CO(SO_4)_2$ were further purified by recrystallization. The recrystallization was carried out in a temperature controlled thermostat from a water based solution. The pH of the water based solution was kept around 2 by adding $H_2SO_4$ to the solution. The recrystallization temperature started at 40° C. and was gradually decreased to about 25° C. during crystallization with constant stirring.

The crystallization of $K_2Ni_xCo_{(1-x)}(SO_4)_2.6H_2O$ was carried out under conditions suitable for growing $NiSiF_6.6H_2O$ crystals. The conditions are described in detail in the U.S. Pat. No. 5,837,054, which is hereby incorporated by reference. In one embodiment, a saturated $K_2Ni(SO_4)_2$/$K_2CO(SO_4)_2$ solution was prepared at an elevated temperature of 35° C. to 45° C., preferably at about 40° C. The temperature of the solution is then lowered gradually (e.g., at a rate of 0.2° C.-5° C./100 hour) to allow the formation of $K_2Ni_xCo_{(1-x)}(SO_4)_2.6H_2O$ crystals.

$H_2SO_4$ may be added to the $K_2Ni(SO_4)_2$/$K_2Co(SO_4)_2$ solution to keep the pH of the solution in the range of 1-3, preferably at pH 2, to improve the quality of crystals by stopping nucleation.

Example 3

Preparation of $Ni_xCo_{(1-x)}(BF_4)_2.6H_2O$ Crystals $Ni_xCo_{(1-x)}(BF_4)_2.6H_2O$ crystals were grown in a saturated solution of $Ni(BF_4)_2$ and $Co(BF_4)_2$. Commercially available $Ni(BF_4)_2$ and $Co(BF_4)_2$ were further purified by recrystallization. The recrystallization was carried out in a temperature controlled thermostat from a water based solution. The pH of the water based solution was kept around 2 by adding HF to the solution. The recrystallization temperature started at 40° C. and was gradually decreased to about 25° C. during crystallization with constant stirring.

The crystallization of $Ni_xCo_{(1-x)}(BF_4)_2.6H_2O$ was carried out under conditions suitable for growing $NiSiF_6.6H_2O$ crystals. The conditions are described in detail in the U.S. Pat. No. 5,837,054, which is hereby incorporated by reference. In one embodiment, a saturated $K_2Ni(SO_4)_2$/$K_2Co(SO_4)_2$ solution was prepared at an elevated temperature of 35° C. to 45° C., preferably at about 40° C. A small pre-grown seed crystal was added to the saturated solution for the nucleating. The temperature of the solution was then lowered gradually (e.g., at a rate of 0.2° C.-5° C./100 hour) to allow crystallization. The crystal grew on the seed, to a size which would allow a filter with a diameter of greater than three centimeters to be fabricated.

Example 4

Fabrication of Filters from $Ni_xCo_{(1-x)}SiF_6.6H_2O$ Crystals

Grown crystals of $Ni_xCo_{(1-x)}SiF_6.6H_2O$ were cut by a string saw into desired sizes. The cylindrical disc filter was fabricated by mounting the crystal on a prefabricated precise circular rod. Crystals were mounded on the rod with wax. The steel rod was then rotated to shape the crystal into desired radius size. Crystal disc was demounted and polished by using a nanaqueous lubricant, such as Linde powder or ethylene glycol. The doped crystals ($Ni_xCo_{(1-x)}SiF_6.6H_2O$) showed superior fabricability (in both cutting and polishing) to that of pure crystals ($NiSiF_6.6H_2O$.

Example 5

Spectroscopic Characterization of $Ni_xCo_{(1-x)}SiF_6.6H_2O$ Filters

Figure 2A:
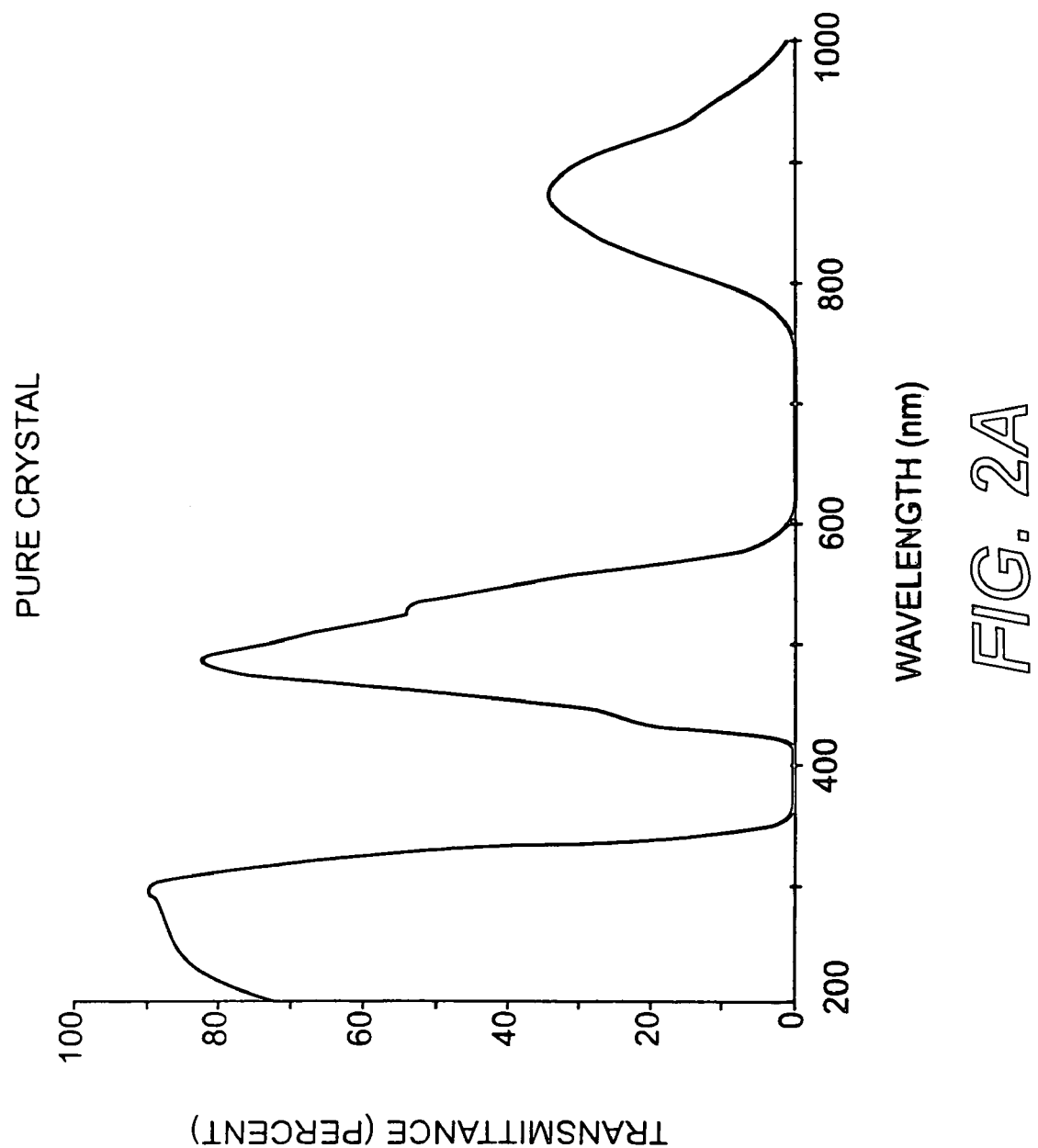

The short and long term stability of $Ni_xCo_{(1-x)}SiF_6.6H_2O$ crystals were studied by differential thermal analysis up to 95° C. No decomposition was detected. As shown in FIGS. 2A and 2B, the spectral transmission of discs prepared from pure nickel $NiSiF_6.6H_2O$ (FIG. 2A) is quite different from the spectral transmission of discs prepared from $Ni_xCo_{(1-x)}SiF_6.6H_2O$ (FIG. 2B). The doped crystal filter blocks the unwanted transmission in the 400-600 nm and 800-1000 nm ranges, and hence increases the efficiency of the filter.

Example 6

Preparation of Filters Doped with Multiple Ions

Approximately 50 ml of saturated $Ni_xCo_{(1-x)}SiF_6.6H_2O$ or $K_2Ni_xCo_{(1-x)}(SO_4)_2.6H_2O$ solution was mixed with 0.5 ml of saturated $PbCO_3$, $CaCO_3$, or a mixture of $PbCO_3$, $CaCO_3$ solution prepared in HCl. The solutions were prepared at an elevated temperature of 35° C. to 45° C., preferably at about 40° C. A small pre-grown seed crystal was added to the saturated solution for the nucleating. The temperature of the solution was then lowered gradually (e.g., at a rate of 0.2° C.-5° C./100 hour) to allow crystallization.

$Pb^{2+}$ and/or $Ca^{2+}$ doped $Ni_xCo_{(1-x)}SiF_6.6H_2O$ and $K_2Ni_xCo_{(1-x)}(SO_4)_2.6H_2O$ crystals showed a narrow window of transparency (see e.g., U.S. patent application Ser. No. 11/580,834). This clearly demonstrates that the transmission/absorbance spectra of single-doped $Ni_xCo_{(1-x)}SiF_6.6H_2O$ and $K_2Ni_xCo_{(1-x)}(SO_4)_2.6H_2O$ can be further tuned to desired ranges by doping with additional ions.

The foregoing discussion discloses and describes many exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A nuclear radiation detection system, comprising:
   an optical assembly capable of focusing on a source of radiation;
   a UV filter assembly having a narrowband UV crystal filter and positioned to receive light transmitted through the optical assembly; and
   a light detector positioned to receive light transmitted through the UV filter assembly,
   wherein the narrowband UV crystal filter is fabricated from crystals selected from the group consisting of nickel fluorosilicate doped with at least one dopant, nickel fluoroborate doped with at least one dopant, and potassium nickel sulfate doped with at least one dopant,
   wherein said dopant is selected from the group consisting of salts of cobalt, calcium, barium, strontium, lead, copper, germanium, praseodymium, neodymium, zinc, lithium, potassium, sodium, rubidium, and cesium.

2. The system of claim 1, wherein the UV filter assembly has a transmission window for light having a wavelength of between about 200 nm and about 350 nm.

3. The system of claim 2, wherein the UV filter assembly has a transmission window for light having a wavelength of between about 200 nm and about 300 nm.

4. The system of claim 3, wherein the UV filter assembly has a transmission window for light having a wavelength of between about 250 nm and about 300 nm.

5. The system of claim 1, wherein the narrowband UV crystal filter is fabricated from crystals selected from the group consisting of cobalt doped nickel fluorosilicate, cobalt doped nickel fluoroborate, and cobalt doped potassium nickel sulfate.

6. The system of claim 1, wherein the narrowband UV crystal filter is fabricated from crystals selected from the group consisting of cobalt nickel fluorosilicate further doped with lead, calcium or a mixture thereof; cobalt nickel fluoroborate further doped with lead, calcium or a mixture thereof; and cobalt potassium nickel sulfate further doped with lead, calcium or a mixture thereof.

7. The system of claim 1, wherein the narrowband UV crystal filter is fabricated from cobalt nickel fluorosilicate crystals having a formula of $Ni_xCo_{(1-x)}SiF_6.6H_2O$, where $0<x<1$.

8. The system of claim 1, wherein the narrowband UV crystal filter is fabricated from crystals of $Ni_xCo_{(1-x)}SiF_6.6H_2O$ doped with $PbCO_3$, $CaCO_3$ or a mixture thereof, where $0<x<1$.

9. The system of claim 1, wherein the narrowband UV crystal filter is fabricated from crystals of $K_2Ni_xCo_{(1-x)}(SO_4)_2.6H_2O$ doped with $Pb^{+2}$, $Ca^2$ or a mixture thereof, where $0<x<1$.

10. The system of claim 1, wherein said optical assembly comprises an optical lens.

11. The system of claim 1, wherein said light detector comprises a point detector.

12. The system of claim 1, wherein said light detector comprises a two-dimensional detector array.

13. The system of claim 1, further comprising an alarm or display device.

14. The system of claim 1, wherein said system can have a detection range of one kilometer or longer.

15. A radiation detection system, comprising:
   an optical assembly capable of focusing on a source of radiation;
   a UV filter assembly having a transmission window in a desired spectral region and positioned to receive light transmitted through the optical assembly; and a light detector positioned to receive light transmitted through the UV filter assembly, wherein the UV filter assembly comprises a narrowband UV crystal filter fabricated from crystals selected from the group consisting of nickel fluorosilicate crystals, nickel fluoroborate crystals, and potassium nickel sulfate crystals, and wherein said nickel fluorosilicate crystals, nickel fluoroborate crystals, and potassium nickel sulfate crystals are doped with at least one dopant.

16. The radiation detection system of claim 15, wherein the desired spectral region includes radiation having a wavelength between about 200 nm and 350 nm.

17. The radiation detection system of claim 15, wherein said dopant is selected from the group consisting of salts of cobalt, calcium, barium, strontium, lead, copper, germanium, praseodymium, neodymium, zinc, lithium, potassium, sodium, rubidium, and cesium.

18. The radiation detection system of claim 15, wherein said nickel fluorosilicate crystals, nickel fluoroborate crystals, and potassium nickel sulfate crystals are doped with ions to make narrow band filter.

19. The radiation detection system of claim 15, further comprising an alarm device or display device.

* * * * *